United States Patent Office 3,084,176
Patented Apr. 2, 1963

3,084,176
PROCESS FOR THE PREPARATION OF SURFACE ACTIVE REACTION PRODUCTS
Gerhard Dieckelmann, Dusseldorf-Holthausen, and Jürgen Plapper, Dusseldorf, Germany, assignors to Böhme Feltchemie G.m.b.H., Dusseldorf, Germany, a corporation of Germany
No Drawing. Filed Apr. 12, 1961, Ser. No. 102,388
9 Claims. (Cl. 260—400)

This invention relates to surface active compounds which are readily emulsifiable or soluble in aqueous solutions under alkaline, neutral or slightly acid conditions, which form stable, light fast emulsions.

We have found that excellently emulsifiable or water-soluble reaction products can be obtained from unsaturated compounds containing lipophilic radicals and salts of sulfurous acid, by first epoxidizing these unsaturated compounds in known fashion, subsequently subjecting the epoxidized products to a treatment with oxygen or oxygen-yielding agents, and subjecting the products thus obtained to a reaction with salts of sulfurous acid. Surface active products with manifold technical utility are obtained thereby, which contain as water solubilizing groups not only α-hydroxy sulfonate radicals but also to a certain extent sulfonate, sulfate and sulfitate radicals. The products are light in color, light-stable, and storage-stable, and are primarily of an oily character.

The process is carried out by partially epoxidizing an unsaturated fatty substance serving as the starting material, such as unsaturated triglyceride or unsaturated fatty acid ester, in accordance with known processes with lower organic mono- or polybasic peracids, such as peracetic acid, perbenzylic acid or performic acid, or also in accordance with the process described in copending application Serial No. 789,231, filed January 27, 1959, now Patent No. 2,992,237. Partial epoxidation products are formed thereby which still contain untransformed double bonds.

These partial fat epoxides, which should advantageously have an epoxide oxygen content of 0.3–3%, are subsequently treated in the first stage with air at temperatures between 20 and 120° C., preferably 70–80° C., preferably in the presence of catalysts. By this treatment peroxide groups, among others, are formed in the pre-epoxidized starting material. The average amount of air used for this purpose per hour is 1.5 times based on the volume of starting material. For example, 1800 liters of pre-epoxidized starting product are reacted with 1.8 cubic meter time 1.5 cubic meter of air per hour. The air treatment is interrupted when about 300–900, preferably 400–600, milliequivalents of oxygen per kg. of epoxidized starting material have been absorbed. In place of passing air therethrough, a treatment with solutions of hydrogen peroxide may be substituted, the excess of which must subsequently be removed. However, the oxygen treatment may also be carried out with hydrogen peroxide-urea adducts, percarbonates, perborates, etc., by incorporating these per-compounds, for example, into the epoxides to be oxidized.

After the oxygen treatment is accomplished, salts of sulfurous acid are allowed to flow into the fatty substances containing epoxide and peroxide groups at temperatures of 50 to 100° C., preferably 60 to 70° C., which constitutes the second step of the process. These salts react at the epoxide groups and with some of the double bonds which are still present, forming α-hydroxy sulfonate or sulfonate, or sulfate radicals. The peroxide radicals which were necessary as a catalyst for the reaction are partially transformed into free hydroxyl groups.

These two last-mentioned steps may also be combined by treating a mixture of the unsaturated fatty substances containing epoxide groups and salts of sulfurous acids with the oxygen-yielding agent, such as with air. During the oxygen treatment, especially during the treatment with air, it is of advantage to use concurrently catalysts, such as those which are usually employed as dessicants in the drying of oils, that is, lead naphthenate, cobalt soaps, manganese soaps, or zinc soaps, and the like. These are employed in a concentration of 0.01 to 1%, preferably 0.01 to 0.05% based on the oil.

Suitable starting materials for this process are high molecular unsaturated hydrocarbons, alcohols, ethers, carboxylic acids, esters, amides, and the like, that is olefins, such as dodecene, octadecene, squalene, esters of unsaturated high molecular alcohols with 14 to 20 carbon atoms, especially of oleyl alcohol or of other mono- or poly-unsaturated alcohols with any desired low molecular or high molecular mono- or polybasic carboxylic acids, as well as ethers of such alcohols. Further suitable are esters and amides of unsaturated high molecular fatty acids, such as naturally occurring glycerides, whose fatty acid moiety may be mono- or polyunsaturated, such as soybean oil, cotton-seed oil, rape oil, linseed oil, castor oil, sunflower seed oil, olive oil, neat's foot oil as well as unsaturated waxes and train oils such as sperm oil, herring oil, cod liver oil, shark oil or whale oil, or also their esterification products. Further suitable as starting materials are esters of unsaturated fatty acids with mono- or polyvalent alcohols of the aliphatic, cycloaliphatic, aromatic or heterocyclic series, as well as esters of unsaturated carboxylic acids and alcohol mixtures and unsaturated mixed esters of polyvalent alcohols with various unsaturated carboxylic acids. Also suitable are esters in which the acid moiety as well as the alcohol moiety contain a mono- or polyunsaturated hydrocarbon radical. Examples of amides of unsaturated fatty acids which may be used as starting materials are those derived from ammonia, dimetylamine, dodecylamine, oleylamine, ethylenediamines, cyclohexylamine, benzylamine, and the like. The process is particularly suitable for the treatment of fish oils and other marine animal oils of inferior quality and dark color.

Sulfurous acid salts which may be used for the process according to the invention include primarily aqueous alkali metal disulfites or ammonium disulfites. However, the dry salts may also be added to the reaction mixture together with the calculated amount of water, or sulfur dioxide may be introduced into the reaction mixture after addition of water and alkali. The amounts of sulfurous acid salts or their adducts required for the treatment of the epoxidation products depends essentially upon the number of double bonds per mol which are still present or remain unchanged after the epoxidation and the oxygen treatment.

Products are obtained in this manner which contain the above described water-solubilizing groups in addition to partially unchanged starting materials and which exhibit excellent emulsifying properties under slightly acid, neutral as well as alkaline conditions. By dilution thereof with hot water, emulsions with high electrolyte stability are formed whose degree of dispersion may be varied by a corresponding selection of the starting material, the epoxide oxygen content and the sulfation degree, depending upon the intended purpose of use.

The process may be carried out technically in closed stirring vessels which are equipped with suitable venting devices for the acid vapors formed by the reaction. The fatty epoxide material to be sulfited is first prepared in the usual manner and is placed into the stirring vessel and is then treated in the presence of a catalyst, such as manganese oleate, in a temperature range of 60–100° C., preferably at 70–80° C., for about 5 to 10 hours with an aqueous 20–50%, preferably 30%, sodium bisulfite solution. During this treatment the aqueous solution and the fatty phase are maintained in fine distribution by an effective stirring device. During the reaction a certain amount of air may be introduced into the reaction mixture through the stirring device; the air acts as a free radical donor for the salt addition reaction and toward the end of the reaction simultaneously serves to carry off the moisture formed during the reaction.

It is preferred, however, to operate in two stages, the first stage being the treatment with air, and in the second stage, the fatty substance mixture containing peroxide groups is reacted in a reaction vessel with the salts of the sulphurous acid. The reaction stages may also be carried out continuously. For this purpose the oxidizing agent is passed through the epoxidate in countercurrent fashion and the oxidation product is continuously treated with these sulphurous acid salts. Other types of air distribution may also be used, for example, the epoxidate and the salt solution may together be atomized through a nozzle while simultaneously admixing oxygen from the air.

Unsaturated fatty materials have previously been partially sulfited by reaction of sulfurous acid salts in the presence of air and possibly in the presence of catalysts. The products formed thereby are not light-fast during extended storage, and particularly the impurities present in the low quality starting materials, such as mucilages or albumin components and their decomposition products, are not removed by this process, which leads to reductions in the quality of the end products. In contrast thereto, the products according to the present invention are oily, light-colored substances which are stable even during prolonged storage and are free from impurities. They are primarily useful with advantage in all those cases where it is necessary to achieve a light color of the products to be treated, such as in the textile and leather finishing industries.

Derivatives of hydrogen peroxide or its reaction products with organic compounds, such as tetralinperoxide or epoxidized oils containing peroxide groups which are obtained from hydrogen peroxide and epoxidized animal and vegetable oils, may also be used as the free radical donor.

The following specific examples are set forth to illustrate the invention and to allow persons skilled in the art to better understand and practice our invention and are not intended to be limitative.

*Example I*

500 kg. of a fish oil epoxide produced according to known processes and containing about 15% free fatty acids and having an epoxide oxygen content of 0.5% as well as an iodine number of 97.7, were treated with oxygen from the air in the presence of 200 gms. of manganese oleate at a temperature of 70–80° C. For the purpose of achieving better distribution of air, the introduction of air is accomplished through a system of columns. The air is passed from the bottom to the top through the unagitated fish oil epoxide layer. The air dosage is controlled by means of a quantitative measuring device, so that 2–2.5 cubic meters per hour of air are consumed and about 500 milliequivalents of oxygen are absorbed.

After 15 hours the fatty epoxide containing peroxide groups is pumped into a heatable stirring vessel which is equipped with a ventilating hood, and 100 kg. of a 40% bisulfite solution is stirred in at a temperature of 60–80° C. over a period of 3 hours. The contents of the reaction vessel are then stirred for 3 hours at the same temperature and the sulfited product is then dried under reduced pressure of 40–60 mm. mercury and at a temperature of 80° C.

For the purpose of removing the inorganic components, which consist primarily of unreacted sodium bisulfite and of sodium sulfate, the product is washed with 20% water and the aqueous mixture is allowed to stand for 10–12 hours at about 80° C. During this time the aqueous inorganic components separate out. A clear, odorless oil is obtained which is readily miscible with water and contains 0.57% of inorganic components. The oil is water-soluble and the solutions exhibit surface active properties.

*Example II*

Using a procedure analogous to that described in Example I, but using instead of a fish train oil epoxide, a sperm oil epoxide having the characteristic values: acid number=0.9, iodine number=54.0, and epoxide oxygen content=1.4%, a virtually salt-free, light and readily emulsifiable sulfited product containing 0.6% of inorganic salts is obtained after the treatment with air and the reaction with bisulfite solution.

*Example III*

500 liters of a sperm oil epoxide prepared in the usual manner (acid number=0.9, epoxide oxygen content=1.0%) are stirred at 100° C. with 300 g. of manganese oleate in small chunks until all of the solid components have gone into solution. Thereafter, the product is treated with air for 12 hours at 70° C.

| Running time: | Peroxide No. (milliequivalents of oxygen per kg.) |
|---|---|
| 2 | 166.3 |
| 5 | 345.0 |
| 7 | 380.0 |
| 9 | 412.0 |
| 11 | 457.0 |
| 12 | 498.0 |

100 parts by weight of a 40% sodium bisulfite solution are added to this sperm oil-epoxide-peroxide in the course of 4 hours, accompanied by vigorous mechanical stirring. At the beginning the reaction product must be cooled to draw off the heat of reaction (70° C.). The reaction mixture is then stirred for an additional 4 hours and the water is removed by distillation under reduced pressure until the mixture has a moisture content of about 15%. After allowing the mixture to stand for 24 hours, the separated salt solution is removed and a clear, light-colored oil which is readily miscible with water is obtained.

*Example IV*

By working in a manner analogous to that described in the preceding example, but using instead of sperm oil epoxide, an ester epoxide which was produced by esterification of linseed alcohol (reduction according to Bouveault-Blanc) with tetrahydrophthalic acid (acid number=0.03, epoxide oxygen content=1.28%), and passing air therethrough for 10 hours, a linseed oil alcohol, tetrahydrophthalate-peroxide with 653.0 milliequivalents oxygen is obtained, which is subsequently reacted with a bisulfite solution as described above in the foregoing examples. The reaction product is a virtually colorless and odorless viscous oil which is soluble in water, accompanied by slight opalescence.

*Example V*

800 parts by weight of a virtually colorless shark oil epoxide prepared in the usual manner (acid number=14.4, epoxide oxygen content=0.75%, iodine number=101.5), are treated with air at 65° C. in the presence of 0.4 part by weight of dissolved manganese oleate until the peroxide content has reached a value of 264.0. 200 parts by weight of a 40% sodium bisulfite solution are allowed to flow into the oxidate in the course of 3.5 hours and thereafter the reaction product is stirred at 70° C. while simultaneously introducing 3 cubic meters per hour of air in finely divided form. The mixture is allowed to stand for about 15 hours at 80° C. in order to separate the salt-containing aqueous components. The oil layer is then treated in a separator at 70° C. in order to remove the last traces of moisture. A clear, odorless oil is obtained. Aqueous emulsions produced therewith remain stable over long periods of time.

Quite generally, the oxygen treatment is carried out in a temperature range of 20–70° C. and, as a rule, starts at lower temperatures. The amount of oxygen to be absorbed lies between 300 to 900 milliequivalents, preferably between 500 and 600 milliequivalents of oxygen.

While we have set forth certain specific embodiments and preferred modes of practice of our invention, it will be understood that they are solely for the purpose of illustrating the invention, and that various changes and modifications may be made in the invention without departing from the spirit of the disclosure or the scope of the appended claims.

We claim:

1. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds, subsequently treating the epoxidation products with air in the presence of catalysts comprising heavy metal soaps and reacting the oxidation products thus obtained with salts of sulfurous acid.

2. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds, subsequently treating the epoxidation products with oxygen-yielding agents selected from the group consisting of oxygen, air and inorganic per-compounds, in the presence of catalysts comprising organic heavy metal soaps and reacting the oxidation products thus obtained with salts of sulfurous acid.

3. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds to an epoxidation content of about 3%, subsequently treating the epoxidation products with oxygen-yielding agents selected from the group consisting of oxygen, air and inorganic per-compounds, in the presence of a catalyst comprising a heavy metal soap of a high molecular fatty acid having a chain length of from about 8 to 26 carbon atoms and reacting the oxidation products thus obtained with salts of sulfurous acid.

4. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds to an epoxidation content of about 3% whereby said epoxidation product still contains free unsaturated bonds, subsequently treating the epoxidation products with oxygen-yielding agents selected from the group consisting of oxygen, air and inorganic per-compounds, in the presence of a catalyst comprising a heavy metal soap of a high molecular fatty acid having a chain length of from about 8 to 26 carbon atoms and reacting the oxidation products thus obtained with salts of sulfurous acid.

5. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds to an epoxidation content of about 3% whereby said epoxidation product still contains free unsaturated bonds, subsequently treating the epoxidation products with oxygen-yielding agents selected from the group consisting of oxygen, air and inorganic per-compounds, in the presence of a catalyst comprising a heavy metal soap of a high molecular fatty acid having a chain length of from about 8 to 26 carbon atoms at temperatures of between about 20° to 70° C., and reacting the oxidation products thus obtained with salts of sulfurous acid.

6. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds to an epoxidation content of about 3% whereby said epoxidation product still contains free unsaturated bonds, subsequently treating the epoxidation products with oxygen-yielding agents selected from the group consisting of oxygen, air and inorganic per-compounds, in the presence of a catalyst comprising a heavy metal soap of a high molecular fatty acid having a chain length of from about 8 to 26 carbon atoms at temperatures of between about 20° to 70° C. until absorption of 300 to 900 milliequivalents of oxygen, and reacting the oxidation products thus obtained with salts of sulfurous acid.

7. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds to an epoxidation content of about 3% whereby said epoxidation product still contains free unsaturated bonds, subsequently treating the epoxidation products with oxygen-yielding agents selected from the group consisting of oxygen, air and inorganic per-compounds, in the presence of a catalyst comprising a heavy metal soap of a high molecular fatty acid having a chain length of from about 8 to 26 carbon atoms at temperatures of between about 20° to 70° C. until absorption of 500 to 600 milliequivalents of oxygen, and reacting the oxidation products thus obtained with salts of sulfurous acid.

8. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds, subsequently treating the epoxidation products simultaneously with oxygen-yielding agents selected from the group consisting of oxygen, air and inorganic per-compounds in the presence of a catalyst comprising a heavy metal soap of a high molecular fatty acid having a chain lenfth of from about 8 to 26 carbon atoms and salts of sulfurous acids.

9. A process for the preparation of surface active reaction products from unsaturated compounds selected from the group consisting of esters of unsaturated fatty acids and esters of unsaturated fatty alcohols, said acids and alcohols having a chain length of from about 10 to 26 carbon atoms and salts of sulfurous acids, comprising the steps of epoxidizing said unsaturated compounds, subsequently treating the epoxidation products with air, in the presence of a catalyst comprising a heavy metal soap of a high melocular fatty acid having a chain length of from about 8 to 26 carbon atoms, and reacting the oxidation products thus obtained with salts of sulfurous acid.

References Cited in the file of this patent

UNITED STATES PATENTS

| | | |
|---|---|---|
| 2,023,768 | Ott et al. | Dec. 10, 1935 |
| 2,466,393 | Dickey et al. | Apr. 5, 1949 |

FOREIGN PATENTS 1,068,251     Germany _____ Nov. 5, 1959

OTHER REFERENCES

Nicolet et al.: J. Am. Chem. Soc., 52, 1186–1191 (1930).

Markley: Fatty Acids, pages 416–424 (1947 edition), Interscience Publishers, Inc., New York, N.Y.